United States Patent
Jeon et al.

(10) Patent No.: US 12,225,211 B2
(45) Date of Patent: Feb. 11, 2025

(54) IMAGE ENCODING AND DECODING METHODS WITH IMPLICIT SPLITTING

(71) Applicants: ELECTRONICS AND TELECOMMUNICATIONS RESEARCH INSTITUTE, Daejeon (KR); CHIPS & MEDIA, INC., Seoul (KR)

(72) Inventors: Min Yong Jeon, Seoul (KR); Dong Jin Park, Seoul (KR); Dae Yeon Kim, Seoul (KR); Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignees: Electronics And Telecommunications Research Institute, Daejeon (KR); CHIPS & MEDIA, INC., Seoul (KR)

( * ) Notice: Subject to any disclaimer, the term of this patent is extended or adjusted under 35 U.S.C. 154(b) by 55 days.

(21) Appl. No.: 16/493,902

(22) PCT Filed: Feb. 27, 2018

(86) PCT No.: PCT/KR2018/002416
§ 371 (c)(1),
(2) Date: Sep. 13, 2019

(87) PCT Pub. No.: WO2018/182184
PCT Pub. Date: Oct. 4, 2018

(65) Prior Publication Data
US 2020/0029082 A1  Jan. 23, 2020

(30) Foreign Application Priority Data
Mar. 31, 2017 (KR) .......................... 10-2017-0042269

(51) Int. Cl.
H04N 19/176 (2014.01)
H04N 19/426 (2014.01)
(Continued)

(52) U.S. Cl.
CPC ......... *H04N 19/176* (2014.11); *H04N 19/426* (2014.11); *H04N 19/503* (2014.11);
(Continued)

(58) Field of Classification Search
CPC .. H04N 19/176; H04N 19/426; H04N 19/503; H04N 19/46; H04N 19/96; H04N 19/119
See application file for complete search history.

(56) References Cited

U.S. PATENT DOCUMENTS

| 10,298,930 B2 | 5/2019 | Li et al. | |
| 2013/0128982 A1* | 5/2013 | Kim | ...................... H04N 19/61 375/240.16 |

(Continued)

FOREIGN PATENT DOCUMENTS

| KR | 10-0772576 B1 | 11/2007 |
| KR | 10-2011-0017719 A | 2/2011 |

(Continued)

OTHER PUBLICATIONS

International Search Report issued on May 30, 2018 in corresponding International Application No. PCT/KR2018/002416 (9 pages in English, 9 pages in Korean).

(Continued)

*Primary Examiner* — Richard T Torrente
(74) *Attorney, Agent, or Firm* — NSIP Law

(57) ABSTRACT

An image decoding method comprises the steps of: obtaining a current coding tree unit (CTU) of a first size configuring a current picture; determining whether to implicitly divide the current coding tree unit; dividing the current coding tree unit into one or more coding units (CUs) based (Continued)

on the determination; obtaining, from a bitstream, division information for a current coding unit among the one or more coding units; and dividing and decoding the current coding unit..

9 Claims, 11 Drawing Sheets

(51) Int. Cl.
    *H04N 19/503*     (2014.01)
    *H04N 19/96*     (2014.01)
    *G06T 9/40*     (2006.01)
    *H04N 19/119*     (2014.01)

(52) U.S. Cl.
    CPC ............... *H04N 19/96* (2014.11); *G06T 9/40* (2013.01); *H04N 19/119* (2014.11)

(56) References Cited

U.S. PATENT DOCUMENTS

| | | | | |
|---|---|---|---|---|
| 2016/0219276 | A1* | 7/2016 | Li | H04N 19/96 |
| 2016/0261875 | A1* | 9/2016 | Zheng | H04N 19/119 |
| 2018/0139441 | A1* | 5/2018 | Choi | H04N 19/176 |
| 2018/0192076 | A1* | 7/2018 | Ikai | H04N 19/176 |
| 2018/0213264 | A1* | 7/2018 | Zhang | H04N 19/70 |
| 2019/0075327 | A1* | 3/2019 | Chono | H04N 19/176 |
| 2019/0253737 | A1* | 8/2019 | Chono | H04N 19/463 |
| 2020/0029082 | A1* | 1/2020 | Jeon | H04N 19/96 |

FOREIGN PATENT DOCUMENTS

| | | |
|---|---|---|
| KR | 10-2013-0086334 A | 8/2013 |
| KR | 10-2014-0098032 A | 8/2014 |
| KR | 10-2014-0127385 A | 11/2014 |
| KR | 10-2016-0040977 A | 4/2016 |
| KR | 10-2017-0108011 A | 9/2017 |

OTHER PUBLICATIONS

Sector, ITU Telecommunication Standardization. "*ITU-T recommendation H. 265: High Efficiency Video Coding.*" Geneva, Switzerland: Telecommunication Standardization Sector, Apr. 2013 (317 pages in English).

Jianle Chen et al., "Algorithm Description of Joint Exploration Test Model 5 (JEM 5)," *JVET of ITU-T and ISO/IEC. JVET-E1001* Ver.2, Feb. 11, 2017 (44 pages in English).

Huang, et al., "EE2.1: Quadtree plus binary tree structure integration with JEM tools" Document: JVET-C0024, Joint Video Exploration Team (JVET) of ITU-T SG 16 WP 3 and ISO/IEC JTC 1/SC 29/WG 11 3rd Meeting: Geneva, CH, May 26-Jun. 1, 2016, (5 pages).

* cited by examiner (a)   (b)

(a)   (b)

IMAGE ENCODING AND DECODING METHODS WITH IMPLICIT SPLITTING

CROSS REFERENCE TO RELATED APPLICATIONS

This application is a U.S. National Stage Application of International Application No. PCT/KR2018/002416, filed on Feb. 27, 2018, which claims the benefit under 35 USC 119 (a) and 365 (b) of Korean Patent Application No. 10-2017-0042269, filed on Mar. 31, 2017in the Korean Intellectual Property Office, the entire disclosure of which is incorporated herein by reference for all purposes.

TECHNICAL FIELD

The present invention relates to an image processing method, a method of decoding and encoding an image using the same, and an apparatus therefor. More particularly, the present invention relates to an image processing method of performing processing of coding tree unit and coding unit, a method of decoding and encoding an image using the same, and an apparatus therefor.

BACKGROUND ART

Digital video technology may be used in a wide range of digital video devices including, for example, digital television, digital direct broadcast systems, wireless broadcast systems, personal digital assistants (PDAs), laptop or desktop computers, digital cameras, digital recording devices, video gaming devices, video game consoles, cellular, satellite radio telephone, or the like, in an integrated manner. The digital video devices may implement a video compression technique such as MPEG-2, MPEG-4, or ITU-T H.264/MPEG-4, Part 10, Advanced Video Coding (AVC), H.265/high efficiency video coding (HEVC) to more efficiently transmit and receive digital video information. The video compression technique performs spatial prediction and temporal prediction to remove or reduce the redundancy inherent in the video sequence.

As such an image compression technique, there are various techniques, such as an inter prediction technique for predicting a pixel value included in a current picture from a previous or subsequent picture of the current picture, an intra prediction technique for predicting a pixel value included in the current picture using pixel information in the current picture, and an entropy encoding technique in which a short code is assigned to a value having a high appearance frequency and a long code is assigned to a value having a low appearance frequency, and the image data may be effectively compressed and transmitted or stored using these image compression techniques.

In order to cost-effectively cope with various resolutions, frame rates, etc. according to such applications, it is necessary to have a video decoding apparatus which is capable of being easily controlled according to performance and functions required in the applications.

Particularly, for the purpose of such applications, the moving picture decoding apparatus can treat coding units of various sizes obtained by partitioning the entire picture corresponding to one frame on a block basis. In particular, in the latest technology, one picture is partitioned into coding tree units having the same size, and each of the coding tree units is recursively partitioned into coding units capable of having sizes different from each other, so that it is possible to perform encoding processing on each of the coding tree units in at least one coding unit, prediction unit, and transform unit having a quadtree structure.

Accordingly, the maximum size of the coding units included in one coding tree unit should be the same as the size of the coding tree unit. As a result, the size of the coding tree unit and the maximum size of the coding unit are not independent, and only the minimum coding unit size information is transmitted to the decoding apparatus and used for partition processing.

Meanwhile, the coding tree unit may be formed by partitioning a picture or a tile to have equal sizes, and each coding tree unit is generally encoded and decoded in a raster order in the picture or tile. Meanwhile, each of the coding units in each coding tree unit is encoded and decoded in a z-scan order.

However, such partitioning and processing method has a problem that the line buffer of the encoder and decoder and the bandwidth of data for processing the line buffer are not considered.

That is, the larger the size of the coding tree unit resulting from partitioning a picture or tile, the larger the size of the line buffer, and the processing bandwidth for using the line buffer is advantageously reduced. However, since the maximum coding unit size is simultaneously increased, there is a problem that the implementation cost of the encoder and the decoder are also increased.

That is, the smaller the maximum coding unit size, the more advantageous in terms of the implementation cost of the encoder and the decoder. Conversely, the larger the coding tree unit is, the more advantageous in terms of the bandwidth reduction by the line buffer. However, there is a problem that the coding tree unit and the maximum coding unit size cannot be independently determined so that it is impossible to simultaneously satisfy both advantages with the structure processed in non-independently.

In addition, considering the line buffer, when only the size of the maximum coding unit using the current encoding scheme is increased, since unnecessary partition information of the coding unit should be substantially transmitted together, there is a problem that the transmission efficiency and compression efficiency are decreased.

DISCLOSURE

Technical Problem

The present invention has been made in order to solve the above problems, and it is an objective of the present invention to provide an image processing method, and a method and apparatus for decoding and encoding an image using the same, in which a coding tree unit size and a maximum coding unit size can be determined independently, thereby achieving the effect of reducing the bandwidth of the line buffer according to the increase in the size of the coding tree unit and the effect of reducing the implementation cost according to the reduction of the maximum coding unit size at the same time.

Technical Solution

In order to solve the above object, a method of decoding an image according to an embodiment of the present invention includes: acquiring coding tree unit information from an image stream; acquiring signaling information on a maximum coding unit size of coding units resulting from partitioning the coding tree unit; and partitioning the coding tree unit stepwise according to the signaling information.

In order to solve the above object, a method of decoding an image according to an embodiment of the present invention includes: acquiring a picture to be encoded; partitioning the picture into coding tree units of a predetermined size; determining a maximum coding unit size of coding units resulting partitioning from the coding tree unit, independently from a size of the coding tree unit; and processing signaling for the maximum coding unit size.

Meanwhile, in order to solve the above object, a method according to an embodiment of the present may be implemented as a program for executing the method on a computer and a nonvolatile recording medium on which the program is stored and readable by a computer.

Advantageous Effects

According to an embodiment of the present invention, it is possible to provide an image processing method, and method and apparatus for decoding and encoding an image using the same, in which a coding tree unit size and a maximum coding unit size can be determined independently by signaling the size difference information between the coding tree unit and the maximum coding unit, thereby achieving the effect of reducing the bandwidth of the line buffer according to the increase in the size of the coding tree unit and the effect of reducing the implementation cost according to the reduction of the maximum coding unit size at the same time.

MODE FOR INVENTION

Hereinafter, embodiments of the present invention will be described in detail with reference to the drawings. In the following description of the embodiments of the present invention, a detailed description of known functions and configurations incorporated herein will be omitted when it may make the subject matter of the present disclosure rather unclear.

It is to be understood that when an element is referred to as being "connected" or "coupled" to another element, the element may be directly connected or coupled to the another element, but there are other elements in between. Further, the description of "including" a specific configuration in the present invention does not exclude a configuration other than the configuration, but means that additional configurations may be included in a range of the practice of the present invention or the technical scope of the present invention.

The terms first, second, etc. may be used to describe various components, but the components should not be limited by the terms. The terms are used only for the purpose of distinguishing one component from another. For example, without departing from the scope of the present invention, the first component may be referred to as a second component, and similarly, the second component may also be referred to as a first component.

In addition, the constituent units shown in the embodiments of the present invention are shown separately to represent different characteristic functions, and each component does not mean that each constituent unit is configured with a separate hardware or one software constituent unit. That is, each constituent unit is included in a list for convenience of explanation, and at least two constituent units of the constituent units may be combined to form one constituent unit, or one constituent unit may be partitioned into a plurality of constituent units to perform each function. The integrated embodiments and separate embodiments of such constituent units are also included within the scope of the present invention unless they depart from the essence of the present invention.

In addition, some of the components are not essential components to perform essential functions, but optional components only to improve performance in the present invention. The present invention may be implemented only with components essential for realizing the essence of the present invention, except for components used for the performance improvement, and a structure including the essential components except the optional components used for performance improvement are also included in the scope of the present invention.

Figure 1:
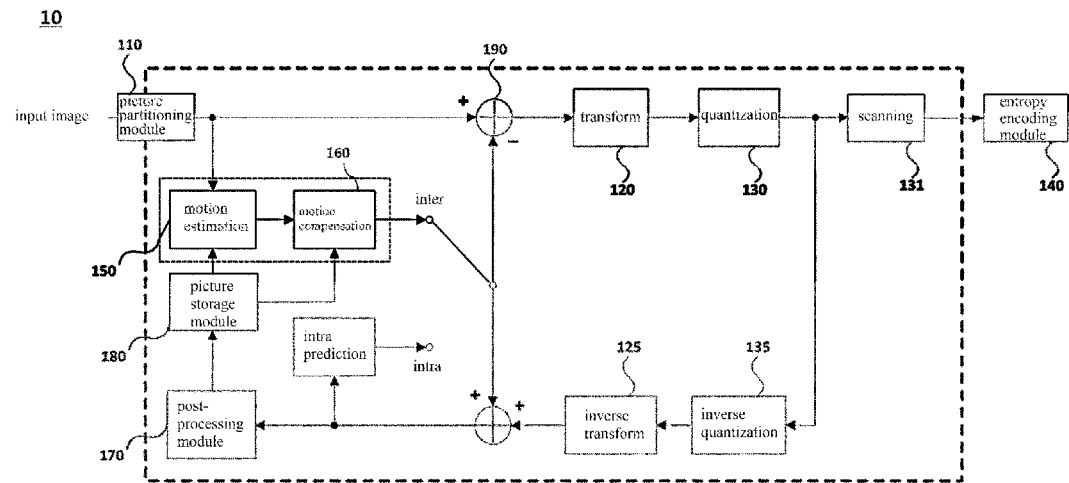
FIG. 1 is a block diagram illustrating a configuration of an image encoding apparatus according to an embodiment of the present invention.

FIG. 1 is a block diagram illustrating a configuration of an image encoding apparatus according to an embodiment of the present invention. The image encoding apparatus 10 includes a picture partitioning module 110, a transform module 120, a quantization module 130, a scanning module 131, an entropy encoding module 140, an intra prediction module 150, an inter prediction module 160, a dequantization module 135, an inverse transform module 125, a post-processing module 170, a picture storage module 180, a subtractor 190, and an adder 195.

Referring to FIG. 1, the picture partitioning module 110 analyzes an input video signal and partitions a picture into coding units to determine a prediction mode and determine a prediction unit size for each coding unit.

In addition, the picture partitioning module 110 sends a prediction unit to be encoded to the intra prediction module 150 or the inter prediction module 160 according to a prediction mode (or prediction method). Also, the picture partitioning module 110 sends a prediction unit to be encoded to the subtractor 190.

Here, a picture of an image is composed of a plurality of slices, and the slice may be partitioned into a plurality of coding tree units (CTUs), which are the basic units of picture partitioning.

The coding tree unit may be partitioned into one or at least two coding units (CUs), which are the basic units of inter prediction or intra prediction.

Here, the maximum size of the coding tree unit and the coding unit may be different from each other, and the signaling information thereon may be transmitted to the decoding apparatus 20. This will be described later in more detail with reference to FIG. 17.

The coding unit (CU) may be partitioned into one or at least two prediction units (PU), which are the basic unit of prediction.

In this case, the encoding apparatus 10 determines any one of inter prediction and intra prediction as prediction methods as a prediction method for each of the coding units (CUs) resulting from the partitioning, but a prediction block may be generated differently from each other for each of prediction units (CUs).

Meanwhile, the coding unit (CU) may be partitioned into one or two or more transform units (TU), which are the basic unit of transform performed on a residual block.

In this case, the picture partitioning module 110 may transmit the image data to the subtractor 190 in units of blocks (for example, a prediction unit (PU) or a transform unit (TU)) resulting from the partitioning as described above.

Figure 2:
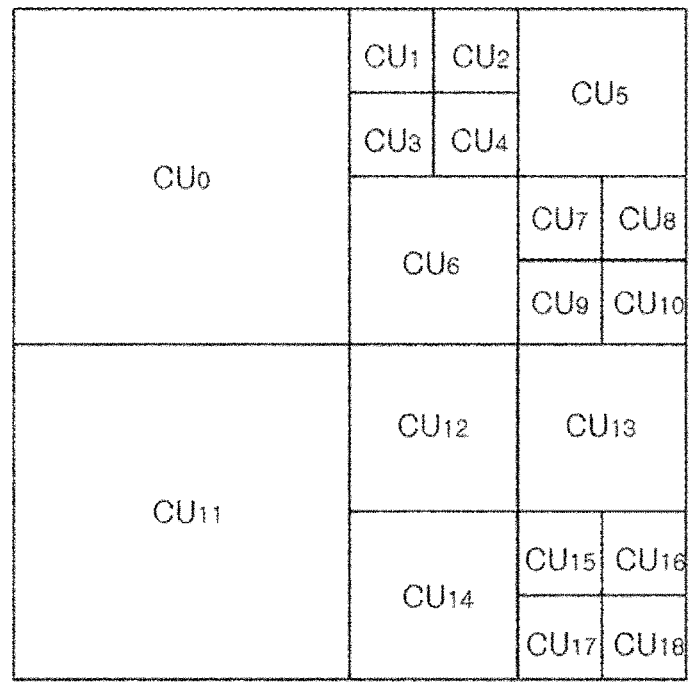
FIGS. 2 to 5 are diagrams illustrating a first embodiment of a method of partitioning and processing an image into block units.

Referring to FIG. 2, a coding tree unit (CTU) having a maximum size of 256×256 pixels is partitioned using a quadtree structure into four coding units (CUs) each having a square shape.

Each of the four coding units (CUs) having a square shape may be further partitioned using a quadtree structure. The depth of the coding units (CUs) has any one integer from zero to three.

The coding units (CUs) may be partitioned into one or at least two prediction units (PU) according to a prediction mode.

Figure 3:
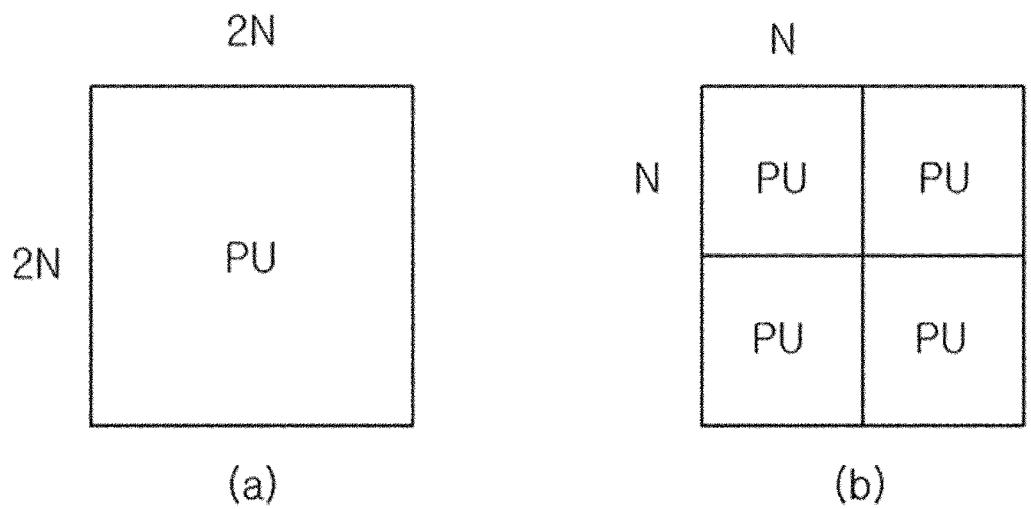

In the case of the intra prediction mode, when the size of the coding unit (CU) is 2N×2N, the prediction unit (PU) has a size of 2N×2N shown in FIG. 3(*a*) or a size of N×N shown in FIG. 3(*b*).

Figure 4:
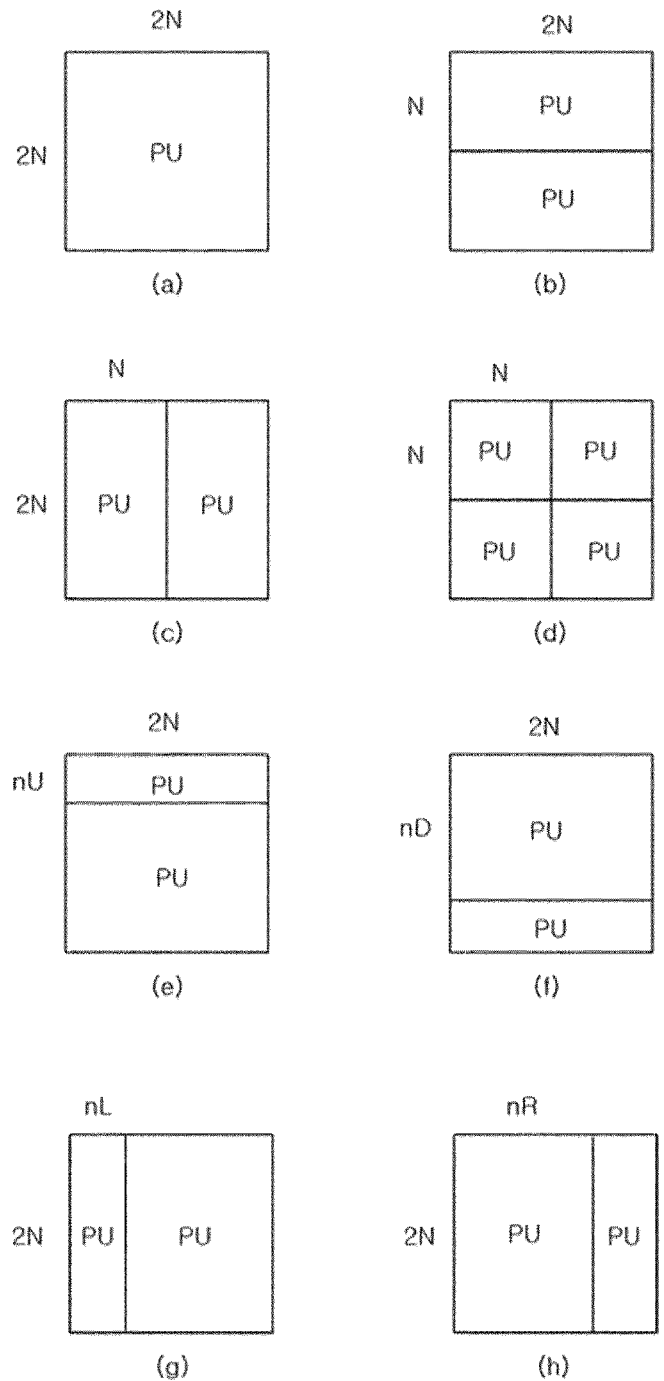

Meanwhile, in case of the inter prediction mode, when the size of the coding unit (CU) is 2N×2N, the prediction unit (PU) has any one size of 2N×2N shown in FIG. 4(*a*), 2N×N shown in FIG. 4(*b*), N×2N shown in FIG. 4(*c*), N×N shown in FIG. 4(*d*), 2N×nU shown in FIG. 4(*e*), 2N×nD shown in FIG. 4(*f*), nL×2N shown in FIG. 4(*g*), and nR×2N shown in FIG. 4(*h*).

Figure 5:
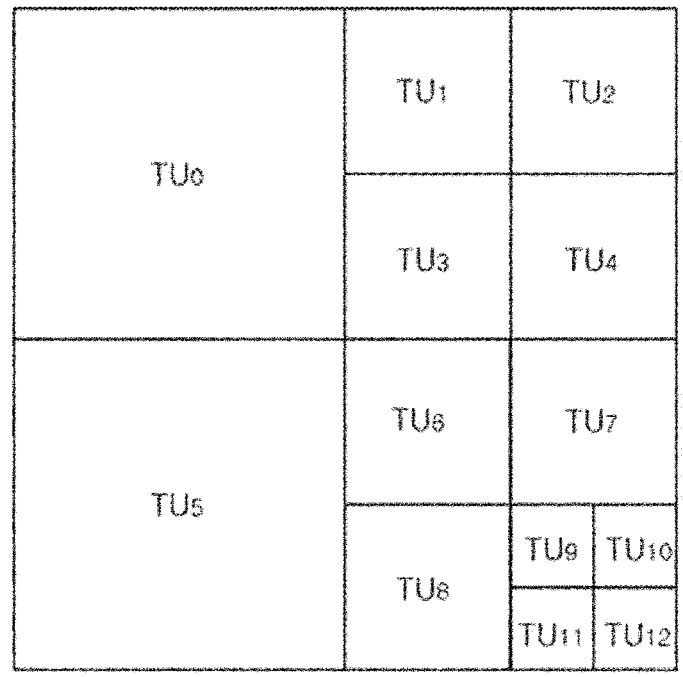

Referring to FIG. 5, a coding unit (CU) may be partitioned using a quadtree structure into four transform units (TUs) each having a square shape.

Each of the four transform units (TUs) having a square shape may be further partitioned using the quadtree structure. The depth of the transform units (TUs) resulting from the quadtree partitioning may have any one integer value from zero to three.

Here, when the coding unit (CU) is the inter prediction mode, the prediction unit (PU) and the transform unit (TU) resulting from the partitioning of the corresponding coding unit (CU) may have partitioning structures independent of each other.

When the coding unit (CU) is the intra prediction mode, the size of the transform unit (TU) resulting from the partitioning of the coding unit (CU) may not be larger than the size of the prediction unit (PU).

In addition, the transform unit (TU) resulting from the partitioning as described above may have a maximum size of 64×64 pixels.

The transform module 120 transforms a residual block, which is a residual signal between an original block of the input prediction unit (PU) and a prediction block generated by the intra prediction module 150 or the inter prediction module 160, in which the transform may be performed by using the transform unit (TU) as the basic unit.

In the transform process, different transform matrices may be determined according to a prediction mode (intra or inter), and the residual signal of intra prediction is directional according to the intra prediction mode so that the transform matrix may be adaptively determined according to the intra prediction mode.

A basic unit of transform may be transformed by two (horizontal and vertical) one-dimensional transform matrices. For example, in the case of inter prediction, one predetermined transform matrix may be determined.

Meanwhile, in the case of intra prediction, when the intra prediction mode is horizontal, there is a higher probability that the residual block is directional in the vertical direction. Therefore, the DCT-based integer matrix is applied in a vertical direction, and a DST-based or KLT-based integer matrix is applied in a horizontal direction. When the intra prediction mode is vertical, a DST-based or KLT-based integer matrix is applied in a vertical direction, and a DCT-based integer matrix is applied in a horizontal direction.

Further, in the case of the DC mode, a DCT-based integer matrix is applied in both directions.

In the case of intra prediction, the transform matrix may be adaptively determined on the basis of the size of the transform unit (TU).

The quantization module 130 determines a quantization step size for quantizing coefficients of the residual block transformed by the transform matrix, in which the quantization step size may be determined for each quantization unit having a predetermined size or more.

The size of the quantization unit may be 8×8 or 16×16, and the quantization module 130 quantizes coefficients of the transform block using the quantization matrix determined according to the quantization step size and the prediction mode.

Further, the quantization module 130 may use a quantization step size of a quantization unit adjacent to the current quantization unit as the quantization step size predictor of the current quantization unit.

The quantization module 130 searches the left quantization unit, the top quantization unit, and the top left quantization unit of the current quantization unit, in this order, for one or two valid quantization step sizes, and generates the quantization step size predictor of the current quantization unit using the same.

For example, the quantization module 130 determines the first valid quantization step size resulting from the searching in the above order as a quantization step size predictor, or determines an average value of two valid quantization step sizes resulting from the searching in the above order as a quantization step size predictor, or when only one quantization step size is valid, determines the same as a quantization step size predictor.

When the quantization step size predictor is determined, the quantization module 130 transmits the difference value between the quantization step size of the current quantization unit and the quantization step size predictor to the entropy coding unit 140.

Meanwhile, there are no left coding unit, top coding unit, and top left coding unit of the current coding unit, or there may be a coding unit previously present in the coding order within the maximum coding unit.

Therefore, the quantization step sizes of the quantization units adjacent to the current coding unit and the immediately preceding quantization unit in the coding order in the maximum coding unit may be candidates.

In this case, a priority may be set in this order of 1) the left quantization unit of the current coding unit, 2) the top quantization unit of the current coding unit, 3) the top left side quantization unit of the current coding unit, and 4) the immediately preceding quantization unit in the coding order. The order may be changed, and the top left side quantization unit may be omitted.

Meanwhile, the quantized transform block is transmitted to the dequantization module 135 and the scanning unit 131.

The scanning unit 131 scans coefficients of the quantized transform block and transforms the same into one-dimensional quantization coefficients. In this case, since the coefficient distribution of the transform block after quantization may depend on the intra prediction mode, the scanning method may be determined according to the intra prediction mode.

Also, the coefficient scanning method may be determined depending on the size of the basic unit of transform, and the scan pattern may be varied according to the directional intra prediction mode. In this case, the scan order of the quantization coefficients may be scanned in the reverse direction.

When the quantized coefficients are divided into a plurality of subsets, the same scan pattern may be applied to quantization coefficients in each subset, and a zigzag scan or a diagonal scan may be applied to the scan pattern between the subsets.

Meanwhile, it is preferable that the scan pattern is applied starting from the main subset including the DC to the remaining subset in the forward direction, but it is also possible in the reverse direction thereof.

In addition, the scan pattern between subsets may be set in the same manner as the scan pattern of quantized coefficients in a subset, and the scan pattern between subsets may be determined according to an intra prediction mode.

Meanwhile, the encoding apparatus 10 is configured so that information capable of indicating the position of the last non-zero quantization coefficient in the transform unit (PU) and the position of the last non-zero quantization coefficient in each subset is included in a bitstream and transmitted to the decoding apparatus 20.

The dequantization module 135 performs dequantization on the quantized coefficients as described above, and the inverse transform module 125 performs inverse transform on a per-transform unit (TU) basis to reconstruct transform coefficients resulting from the dequantization into the residual block of space domain.

The adder 195 may generate a reconstructed block by summing the residual blocks reconstructed by the inverse transform module 125 and the prediction blocks received from the intra prediction module 150 or the inter prediction module 160.

Also, the post-processing module 170 performs a deblocking filtering process for eliminating the blocking effect generated in the reconstructed picture, a sample adaptive offset (SAO) application process for compensating the difference value with respect to the original image on a per pixel basis, and an adaptive loop filtering (ALF) process for compensating the difference value with respect to the original image in a coding unit.

The deblocking filtering process may be applied to a boundary of a prediction unit (PU) or a transform unit (TU) having a predetermined size or larger.

For example, the deblocking filtering process may include determining a boundary to be filtered, determining a boundary filtering strength to be applied to the boundary, determining whether or not a deblocking filter is applied, and when it is determined to apply the deblocking filter, selecting a filter to be applied to the boundary.

Meanwhile, whether or not the deblocking filter is determined depending on i) whether a boundary filtering strength is greater than 0, and ii) whether a value indicating the degree of change in pixel values at the boundary of two blocks (P block and Q block) adjacent to the boundary to be filtered is smaller than a first reference value determined by the quantization parameter.

It is preferable that at least two filters are used. When the absolute value of the difference between two pixels located at the block boundary is greater than or equal to a second reference value, a filter that performs relatively weak filtering is selected.

The second reference value is determined by the quantization parameter and the boundary filtering strength.

The sample adaptive offset (SAO) application process is to reduce the distortion between pixels in the image to which the deblocking filter is applied and the original pixels. Whether the sample adaptive offset (SAO) application process is performed or not on a per-picture or slice basis may be determined.

The picture or slice may be partitioned into a plurality of offset areas, and an offset type may be determined for each of the offset areas. The offset type includes a predetermined number (for example, four) of edge offset types and two band offset types.

For example, when the offset type is an edge offset type, the edge type to which each pixel belongs is determined so that the corresponding offset is applied. The edge type is determined on the basis of the distribution of values of two pixels adjacent to the current pixel.

In the adaptive loop filtering (ALF) process, filtering may be performed on the basis of a value obtained by comparing an image reconstructed through the deblocking filtering process or then adaptive offset application process, and the original image.

The picture storage module 180 receives the post-processed image data from the post-processing module 170, and reconstructs and stores the image on a per-picture basis. The picture may be an image on a per-frame basis or an image on a per-field basis.

The inter prediction module 160 may perform motion estimation using at least one reference picture stored in the picture storage module 180, and may determine motion vector and a reference picture index indicating a reference picture.

In this case, according to the determined reference picture index and motion vector, a prediction block corresponding to a prediction unit to be encoded is selected from among reference pictures used for motion estimation among a plurality of reference pictures stored in the picture storage module 180.

The intra prediction module 150 may perform intra prediction coding using the reconstructed pixel values in the picture including the current prediction unit.

The intra prediction module 150 receives the current prediction unit to be prediction coded, and performs intra prediction by selecting one of a predetermined number of intra prediction modes according to the size of the current block.

The intra prediction module 150 may adaptively filter the reference pixels to generate an intra prediction block and generate the reference pixels using available reference pixels when the reference pixels are not available.

The entropy encoding module 140 may perform entropy encoding on quantization coefficients quantized by the quantization module 130, intra prediction information received from the intra prediction module 150, motion information received from the inter prediction module 160, and the like.

Figure 6:
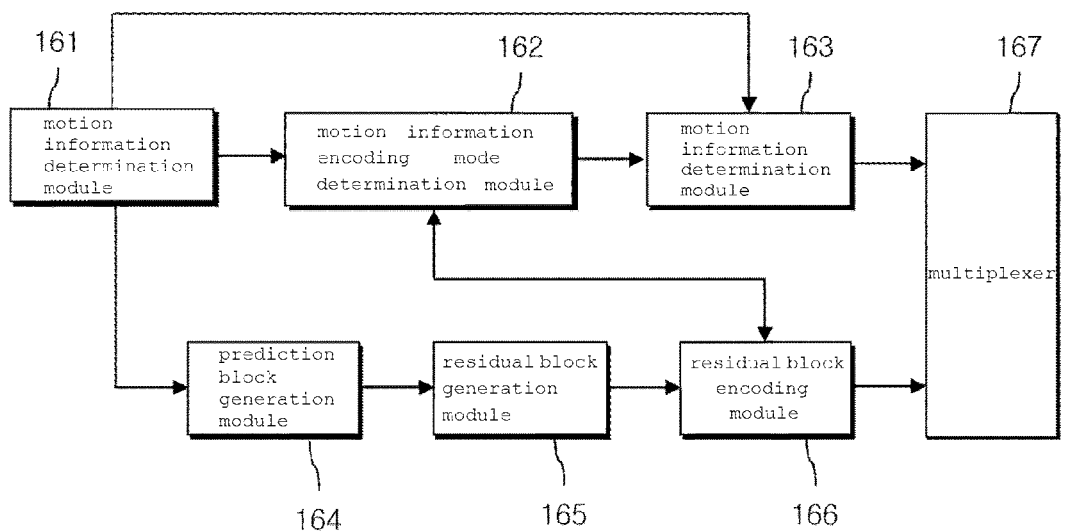
FIG. 6 is a block diagram illustrating an embodiment of a method of performing inter prediction in the image encoding apparatus.

FIG. 6 is a block diagram of an embodiment of a configuration for performing inter prediction in the encoding apparatus 10. The inter prediction encoder shown in FIG. 6 includes a motion information determination module 161, a motion information encoding mode determination module 162, a motion information encoding module 163, a prediction block generation module 164, a residual block generation module 165, a residual block encoding module 166, and a multiplexer 167.

Referring to FIG. 6, a motion information determination module 161 determines motion information of a current block, in which the motion information includes a reference picture index and a motion vector, and the reference picture index represents any one of pictures that are previously encoded and reconstructed.

It is possible to include a reference picture index indicating any one of reference pictures belonging to the list 0 (L0) when the current block is unidirectional inter prediction coded and indicating one of the reference pictures of the list 0 (L0) when the current block is bidirectional prediction coded, and a reference picture index indicating one of the reference pictures of the list 1 (L1).

Also, when the current block is bidirectional prediction coded, it is possible to include an index indicating one or two pictures of the reference pictures of the composite list LC generated by combining the list 0 and the list 1.

The motion vector indicates the position of a prediction block in a picture indicated by each reference picture index, and the motion vector may be a pixel unit (integer unit) or a sub-pixel unit.

For example, the motion vector may have a resolution of ½, ¼, ⅛, or 1/16 pixel. When the motion vector is not an integer unit, the prediction block may be generated from pixels of integer units.

The motion information encoding mode determination module 162 may determine the encoding mode for the motion information of the current block as any one of a skip mode, a merge mode, and an AMVP mode.

The skip mode is applied when a skip candidate having the same motion information as the motion information of the current block is present and the residual signal is 0. The skip mode is applied when the current block, which is a prediction unit (PU), is the same as the coding unit in size.

The merge mode is applied when a merge candidate having the same motion information as the motion information of the current block is present. The merge mode is applied when the current block is different in size from the coding unit (CU), or when the residual signal is present in the case of the same size. Meanwhile, the merge candidate and the skip candidate may be the same.

The AMVP mode is applied when the skip mode and the merge mode are not applied, and the AMVP candidate having the motion vector most similar to the motion vector of the current block may be selected as the AMVP predictor.

The motion information encoding module 163 may encode motion information according to a method determined by the motion information encoding mode determination module 162.

For example, the motion information encoding module 163 performs a merge motion vector encoding process when the motion information encoding mode is the skip mode or the merge mode, and performs the AMVP encoding process when the motion information encoding mode is the AMVP mode.

The prediction block generation module 164 generates a prediction block using the motion information of the current block, and generates a prediction block of the current block by copying the block corresponding to the position indicated by the motion vector in the picture that the reference picture index indicates when the motion vector is an integer unit.

Meanwhile, when the motion vector is not an integer unit, the prediction block generation module 164 may generate pixels of the prediction block from pixels of integer unit in the picture that the reference picture index indicates.

In this case, the prediction pixel is generated using an 8-tap interpolation filter for a luma pixel, and the prediction pixel is generated using a 4-tap interpolation filter for a chroma pixel.

The residual block generation module 165 generates a residual block using the current block and the prediction block of the current block. When the size of the current block is 2N×2N, the residual block generation module 165 uses the current block and the prediction block having the size of 2N×2N corresponding to the current block to generate the residual block.

Meanwhile, when the size of the current block used for prediction is 2N×N or N×2N, a prediction block for each of two 2N×N blocks constituting 2N×2N is obtained, and then the resulting prediction block having the size of 2N×2N may be generated using the two 2N×N prediction blocks.

In addition, a residual block having a size of 2N×2N may be generated using the prediction block having a size of 2N×2N. In order to solve the discontinuity of the boundary of two prediction blocks having a size of 2N×N, overlap smoothing may be applied to pixels at the boundary.

The residual block encoding module 166 divides the residual block into one or at least two transform units (TUs), and each of the transform units (TUs) may be transform-coded, quantized, and entropy-encoded.

The residual block encoding module 166 may transform the residual block generated by the inter prediction method using an integer-based transform matrix, and the transform matrix may be an integer-based DCT matrix.

Meanwhile, the residual block encoding module 166 uses a quantization matrix to quantize coefficients of the residual block transformed by the transform matrix, and the quantization matrix may be determined by the quantization parameter.

The quantization parameters are determined for each coding unit (CU) having a predetermined size or larger. When the current coding unit (CU) is smaller than the predetermined size, the current coding unit (CU) is smaller than the predetermined size, only quantization parameter of the first coding units (CU) in a coding order among the coding units having the predetermined size or smaller is encoded, and quantization parameters of the remaining coding units (CUs) are the same as the parameter and thus are not encoded.

Also, coefficients of the transform block may be quantized using a quantization matrix determined according to the quantization parameter and the prediction mode.

The quantization parameter determined for each coding unit (CU) having the predetermined size or greater may be prediction coded using a quantization parameter of a coding unit (CU) adjacent to the current coding unit (CU).

The quantization parameter predictor of the current coding unit (CU) is generated by searching the left coding unit (CU) and the top coding unit (CU) of the current coding unit (CU), in this order, for one or two valid quantization parameters.

For example, the first valid quantization parameter resulting from searching in the above order may be determined as a quantization parameter predictor. The search is performed in the order of a left coding unit (CU) and an immediately preceding coding unit (CU) in a coding order, thereby determining the first valid quantization parameter as a quantization parameter predictor.

The coefficients of the quantized transform block are scanned and transformed into one-dimensional quantization coefficients, and the scanning method may be set differently according to the entropy encoding mode.

For example, the inter prediction-encoded quantized coefficients may be scanned in a predetermined manner (raster scan in zigzag or diagonal direction) when encoded by CABAC, and scanned in a manner different from the manner when encoded by CAVLC.

For example, the scanning method may be determined according to zigzag mode in the case of inter, the scanning method may be determined according to the intra prediction mode in the case of intra, and the coefficient scanning method may be determined differently according to the size of the basic unit of transform.

Meanwhile, the scan pattern may be changed according to the directional intra prediction mode, and the scan order of the quantization coefficients may be scanned in the reverse direction.

The multiplexer 167 multiplexes the motion information encoded by the motion information encoding module 163 and the residual signals encoded by the residual block encoding module 166.

The motion information may be varied depending on the encoding mode and, for example, may include only an index indicating a predictor in the case of skip or merge, and a reference picture index, a differential motion vector, and an AMVP index of the current block in the case of AMVP.

Hereinafter, an embodiment of the operation of the intra prediction module 150 shown in FIG. 1 will be described in detail.

First, the intra prediction module 150 receives the prediction mode information and the size of the prediction unit (PU) from the picture partitioning module 110, and reads a reference pixel from the picture storage module 180 to determine the intra prediction mode of the prediction unit (PU).

The intra prediction module 150 determines whether or not a reference pixel is generated by examining whether or not there is a reference pixel that is not available, and the reference pixels may be used to determine an intra prediction mode of the current block.

When the current block is located at the upper boundary of the current picture, pixels adjacent to the upper side of the current block are not defined. When the current block is located at the left boundary of the current picture, pixels adjacent to the left side of the current block are not defined, in which the pixels may be determined not to be available pixels.

Also, even when the current block is located at the slice boundary so that pixels adjacent to the top side or the left side of the slice are not pixels that are previously encoded and reconstructed, the pixels may be determined not to be available pixels.

When the pixels adjacent to the left or top side of the current block are not present or the pixels that have been previously coded and reconstructed are not present, the intra prediction mode of the current block may be determined using only available pixels.

Meanwhile, a reference pixel at an unavailable position may be generated using available reference pixels of the current block. For example, when pixels at the top block are not available, some or all of the left pixels may be used to generate the top side pixels, and vice versa.

That is, a reference pixel may be generated by copying an available reference pixel at the nearest position from the reference pixel at the unavailable position in a predetermined direction, or when there is no available reference pixel in the predetermined direction, a reference pixel may be generated by copying an available reference pixel at the nearest position in the opposite direction.

Meanwhile, even when the top or left pixels of the current block exist, the reference pixel may be determined as an unavailable reference pixel according to the coding mode of the block to which the pixels belong.

For example, when the block to which the reference pixel adjacent to the top side of the current block belongs is a block that is inter coded and thus reconstructed, the pixels may be determined to be unavailable pixels.

Herein, the blocks adjacent to the current block are intra coded so that available reference pixels may be generated using pixels belonging to the reconstructed block, and information on which the encoding apparatus 10 determines the available reference pixels according to the encoding mode is transmitted to the decoding apparatus 20.

The intra prediction module 150 determines the intra prediction mode of the current block using the reference pixels, and the number of intra prediction modes that may be accepted in the current block may vary according to the size of the block.

For example, when the size of the current block is 8×8, 16×16, and 32×32, there may be 34 intra prediction modes, and when the size of the current block is 4×4, there may be 17 intra prediction modes.

The 34 or 17 intra prediction modes may be configured with at least one non-directional mode and a plurality of directional modes.

The at least one non-directional mode may be a DC mode and/or a planar mode. When the DC mode and the planar mode are included in the non-directional mode, there may be 35 intra prediction modes regardless of the size of the current block.

Herein, two non-directional modes (DC mode and planar mode) and 33 directional modes may be included.

In the case of planar mode, a prediction block of the current block is generated by using at least one pixel value (or a predicted value of the pixel value, hereinafter referred to as a first reference value) located at the bottom right of the current block and reference pixels.

The configuration of the image decoding apparatus according to an embodiment of the present invention may be derived from the configuration of the image encoding apparatus 10 described with reference to FIGS. 1 to 6. For example, the image may be decoded by reversely performing the processes of the image encoding method as described above referring to FIGS. 1 to 6.

Figure 7:
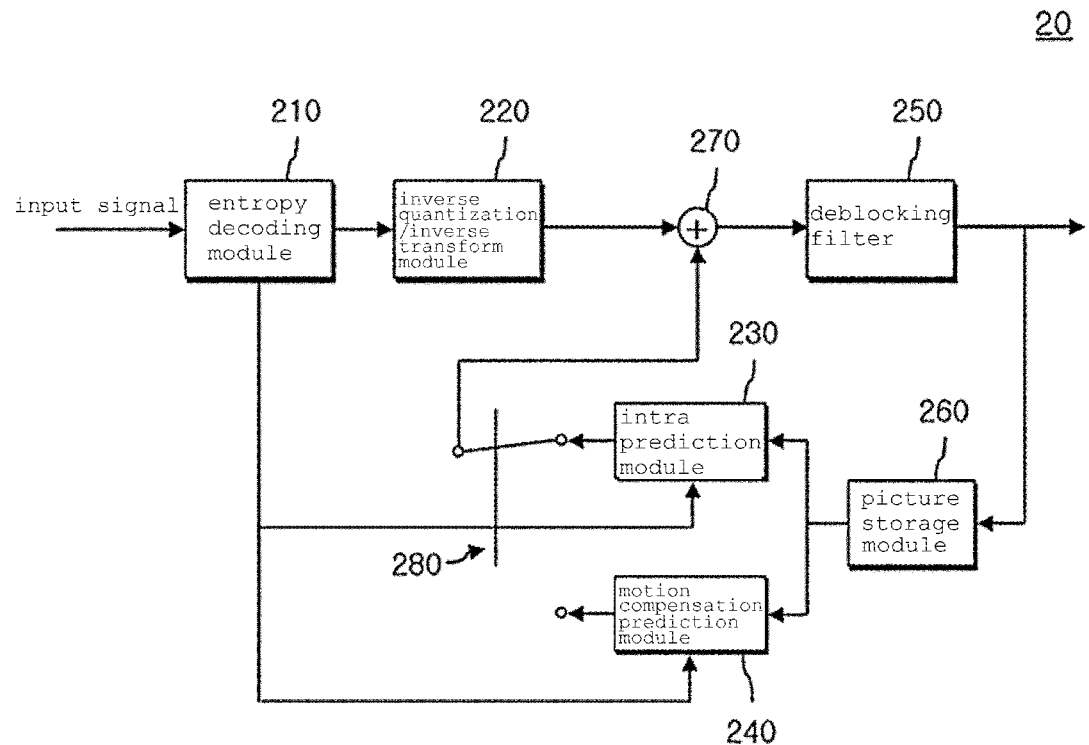
FIG. 7 is a block diagram illustrating a configuration of an image decoding apparatus according to an embodiment of the present invention.

FIG. 7 is a block diagram illustrating the configuration of a video decoding apparatus according to an embodiment of the present invention. The decoding apparatus 20 includes an entropy decoding module 210, a dequantization/inverse transform module 220, an adder 270, a deblocking filter 250, a picture storage module 260, an intra prediction module 230, a motion compensation prediction module 240, and an intra/inter selector switch 280.

The entropy decoding module 210 receives and decodes the bitstream encoded by the image encoding apparatus 10 to cause the same to be divided into intra prediction mode index, motion information, quantization coefficient sequence, and the like, and transmits the decoded motion information to motion compensation prediction module 240.

In addition, the entropy decoding module 210 transmits the intra prediction mode index to the intra prediction module 230 and the dequantization/inverse transform module 220, and transmits the dequantization coefficient sequence to the dequantization/inverse transform module 220.

The dequantization/inverse transform module 220 transforms the quantization coefficient sequence into a dequantization coefficient of a two-dimensional array, and may select one of a plurality of scanning patterns for the transformation and select, for example, scanning pattern on the basis of the prediction mode (i.e., intra prediction or inter prediction) and the intra prediction mode of the current block.

The dequantization/inverse transform module 220 applies quantization matrices selected among from a plurality of quantization matrices to the dequantization coefficients of the two-dimensional array to reconstruct the quantization coefficients.

Meanwhile, the quantization matrix different from each other may be selected according to the size of the current block to be reconstructed, and the quantization matrix may be selected on the basis of at least one of a prediction mode and an intra prediction mode of the current block with respect to a block of the same size.

The dequantization/inverse transform module 220 inversely transforms the reconstructed quantization coefficient to reconstruct a residual block, and the inverse transform process may be performed using the transform unit (TU) as a basic unit.

The adder 270 reconstructs the image block by summing the residual block reconstructed by the dequantization/inverse transform module 220 and the prediction block generated by the intra prediction module 230 or the motion compensation prediction module 240.

The deblocking filter 250 may perform a deblocking filtering process on the reconstructed image generated by the adder 270 to reduce a deblocking artifact caused due to the image loss according to the quantization process.

The picture storage module 260 is a frame memory for storing the local decoded image on which the deblocking filtering processing is performed by the deblocking filter 250.

The intra prediction module 230 reconstructs the intra prediction mode of the current block on the basis of the intra prediction mode index received from the entropy decoding module 210, and generates the prediction block according to the reconstructed intra prediction mode.

The motion compensation prediction module 240 generates a prediction block for the current block from the picture stored in the picture storage module 260 on the basis of the motion vector information and applies the selected interpolation filter to generate the prediction block when the motion compensation of the decimal precision is applied.

The intra/inter selector switch 280 may provide the adder 270 with a prediction block generated in either the intra prediction module 230 or the motion compensation prediction module 240 on the basis of the coding mode.

Figure 8:
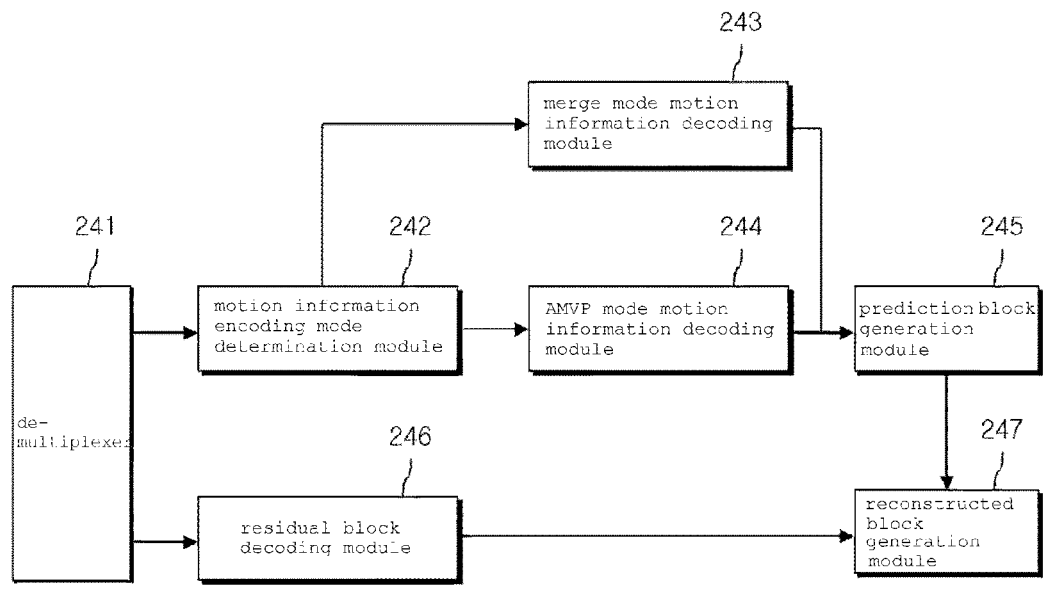
FIG. 8 is a block diagram illustrating an embodiment of a method of performing inter prediction in an image decoding apparatus.

FIG. 8 is a block diagram illustrating an embodiment of a configuration for performing inter prediction in the image decoding apparatus 20. The inter prediction decoder includes a demultiplexer 241, a motion information encoding mode determination module 242, merge mode motion information decoding module 243, an AMVP mode motion information decoding module 244, a prediction block generation module 245, a residual block decoding module 246, and a reconstructed block generation module 247. Here, the merge mode motion information decoding module 243 and the AMVP mode motion information decoding module 244 may be included in the motion information decoding module 248.

Referring to FIG. 8, the demultiplexer 241 demultiplexes the currently encoded motion information and the encoded residual signals from the received bitstream, transmits the demultiplexed motion information to the motion information encoding mode determination module 242, and transmits the demultiplexed residual signal to the residual block decoding unit 246.

The motion information encoding mode determination module 242 determines the motion information encoding mode of the current block, and when the skip_flag of the received bitstream has a value of 1, determines that the motion information encoding mode of the current block is encoded in the skip encoding mode.

When the skip_flag of the received bitstream has a value of 0 and the motion information received from the demultiplexer 241 has only a merge index, the motion information encoding mode determination module 242 determines that motion information encoding mode of the current block is encoded in the merge mode.

In addition, the motion information encoding mode determination module 242 determines that the motion information encoding mode of the current block is encoded in the AMVP mode, when the skip_flag of the received bitstream has a value of 0, and the motion information received from the demultiplexer 241 includes a reference picture index, a differential motion vector, and AMVP index.

The merge mode motion information decoding module 243 is activated when the motion information encoding mode determination module 242 determines that the motion information encoding mode of the current block is a skip or merge mode. The AMVP mode motion information decoding module 244 is activated when the motion information encoding mode determination module 242 determines that the motion information encoding mode of the current block is an AMVP mode.

The prediction block generation unit 245 generates a prediction block of the current block using the motion information reconstructed by the merge mode motion information decoding module 243 or the AMVP mode motion information decoding module 244.

When the motion vector is an integer unit, a prediction block of the current block may be generated by copying the block corresponding to the position indicated by the motion vector in the picture that the reference picture index indicates.

Meanwhile, when the motion vector is not an integer unit, pixels of the prediction block are generated from integer unit pixels in the picture that the reference picture index indicates. Herein, the prediction pixel may be generated by using an 8-tap interpolation filter in the case of a luma pixel and using a 4-tap interpolation filter in the case of a chroma pixel.

The residual block decoding module 246 performs entropy decoding on the residual signal, and inversely scans the entropy-decoded coefficients to generate a two-dimensional quantized coefficient block. The inverse scanning method may be varied according to the entropy decoding method.

For example, the inverse scanning may be applied in a diagonal raster inverse scanning method when decoding is performed on the basis of CABAC, and in a zigzag reverse scanning method when decoding is performed on the basis of CAVLC. Also, the inverse scanning method may be determined differently depending on the size of the prediction block.

The residual block decoding module 246 may dequantize the generated coefficient block using the dequantization matrix, and reconstruct the quantization parameter to derive the quantization matrix. Here, the quantization step size may be reconstructed for each coding unit equal to or larger than a predetermined size.

The residual block decoding module 260 reconstructs the residual block by inversely transforming the dequantized coefficient block.

The reconstructed block generation unit 270 generates a reconstructed block by adding the prediction block generated by the prediction block generation unit 250 and the residual block generated by the residual block decoding module 260.

Hereinafter, an embodiment of a process of reconstructing the current block through intra prediction will be described with reference to FIG. 7 again.

First, an intra prediction mode of the current block is decoded from the received bitstream. For this, an entropy decoding module 210 refers to one of a plurality of intra prediction mode tables to reconstruct a first intra prediction mode index of the current block.

The plurality of intra prediction mode tables are tables shared by the encoding apparatus 10 and the decoding apparatus 20, and any one table selected according to the distribution of intra prediction modes for a plurality of blocks adjacent to the current block may be applied.

For example, when the intra prediction mode of the left block of the current block and the intra prediction mode of the top block of the current block are the same to each other, the first intra prediction mode table is applied to reconstruct the first intra prediction mode table of the current block, and otherwise, the second intra prediction mode table may be applied to reconstruct the first intra prediction mode index of the current block.

As another example, in the case that the intra prediction modes of the top block and the left block of the current block are all the directional intra prediction modes, when the direction of the intra prediction mode of the top block and the direction of the intra prediction mode of the left block are within a predetermined angle, the first intra prediction mode index of the current block is reconstructed by applying the first intra prediction mode table, and when the directions are out of the predetermined angle, the first intra prediction mode index of the current block may be reconstructed by applying the second intra predication mode table.

The entropy decoding module 210 transmits the first intra prediction mode index of the reconstructed current block to the intra prediction module 230.

When the index has a minimum value (i.e., 0), the intra prediction module 230 receiving the first intra prediction mode index determines the maximum possible mode of the current block as the intra prediction mode of the current block.

Meanwhile, when the index has a value other than 0, the intra prediction module 230 compares the index indicated by the maximum possible mode of the current block with the first intra prediction mode index, and when the first intra prediction mode index is not smaller than the index indicated by the maximum possible mode of the current block as a result of the comparison, determines the intra prediction mode corresponding to a second intra prediction mode index obtained by adding 1 to the first intra prediction mode index as the intra prediction mode of the current block, and otherwise, determines the intra prediction mode corresponding to the first intra prediction mode index as the intra prediction mode of the current block.

The allowable intra prediction mode for the current block may be configured with at least one non-directional mode and a plurality of directional modes.

The at least one non-directional mode may be a DC mode and/or a planar mode. In addition, either the DC mode or the planar mode may be adaptively included in the allowable intra prediction mode set.

For this purpose, information specifying the non-directional mode included in the allowable intra prediction mode set may be included in the picture header or slice header.

Next, the intra prediction module 230 reads the reference pixels from the picture storage module 260 and determines whether or not an unavailable reference pixel is present, in order to generate an intra prediction block.

The determination may be made according to whether or not there are reference pixels used to generate the intra prediction block by applying the decoded intra prediction mode of the current block.

Next, when it is necessary to generate a reference pixel, the intra prediction module 230 may generate reference pixels at unavailable positions by using available reference pixels that have been previously reconstructed.

The definition of the unavailable reference pixel and the method of generating the reference pixel may be the same as the operation in the intra prediction module 150 according to FIG. 1. However, according to the decoded intra prediction mode of the current block, the reference pixels used to generate the intra prediction block may optionally be reconstructed.

In addition, the intra prediction module 230 determines whether or not to apply filtering to reference pixels to generate a prediction block. That is, whether or not filtering is applied to the reference pixels is determined on the basis of the decoded intra prediction mode and the size of the current prediction block, in order to generate an intra prediction block of the current block.

As the size of the block increases, blocking artifacts are increased. Accordingly, as the size of the block increases, the number of prediction modes for filtering the reference pixel may be increased. However, when the block is larger than a predetermined size, since the block is determined as a flat region, the reference pixel may not be filtered to reduce complexity.

When it is determined that the reference pixel is required to apply the filter, the intra prediction module 230 filters the reference pixels using the filter.

At least two filters may be adaptively applied according to the degree of difference in depth between the reference pixels. The filter coefficient of the filter is preferably symmetrical.

In addition, the above-mentioned two or more filters may be adaptively applied according to the size of the current block. When the filter is applied, a filter having a narrow bandwidth is applied to a block having a small size, and a filter having a wide bandwidth is applied to a block having a great size.

In the case of the DC mode, since a prediction block is generated as an average value of reference pixels, there is no need to apply the filter. In a vertical mode in which an image has correlation in a vertical direction, there is no need to apply the filter to the reference pixel, and similarly in a horizontal mode in which an image has correlation in a horizontal direction, there is no need to apply the filter to the reference pixel.

Since whether or not the filtering is applied is correlated with the intra prediction mode of the current block, the reference pixel may be adaptively filtered on the basis of the size of the prediction block and the intra prediction mode of the current block.

Next, the intra prediction module 230 generates a prediction block using reference pixels or filtered reference pixels according to the reconstructed intra prediction mode, and the generation of the prediction block is the same as the operation of the encoding apparatus 10 so that a detailed description thereof will be omitted.

The intra prediction module 230 determines whether or not to filter the generated prediction bloc, and whether or not to filter may be determined on the basis of the information included in the slice header or the coding unit header or according to the intra prediction mode of the current block.

When it is determined that the generated prediction block is to be filtered, the intra prediction module 230 filters a pixel at a specific position of a prediction block generated using available reference pixels adjacent to the current block to generate a new pixel.

For example, in the DC mode, a prediction pixel adjacent to reference pixels among prediction pixels may be filtered using a reference pixel adjacent to the prediction pixel.

Accordingly, the prediction pixels are filtered using one or two reference pixels according to the positions of the prediction pixels, and the filtering of the prediction pixels in the DC mode may be applied to prediction blocks of all sizes.

Meanwhile, in the vertical mode, the prediction pixels adjacent to the left reference pixel among the prediction pixels of the prediction block may be changed using reference pixels other than the top pixel used to generate the prediction block.

Likewise, in the horizontal mode, prediction pixels adjacent to the top reference pixel among the prediction pixels generated may be changed using reference pixels other than the left pixel used to generate the prediction block.

The current block may be reconstructed by using the prediction block of the current block reconstructed in this manner and the residual block of the decoded current block.

Figure 9:
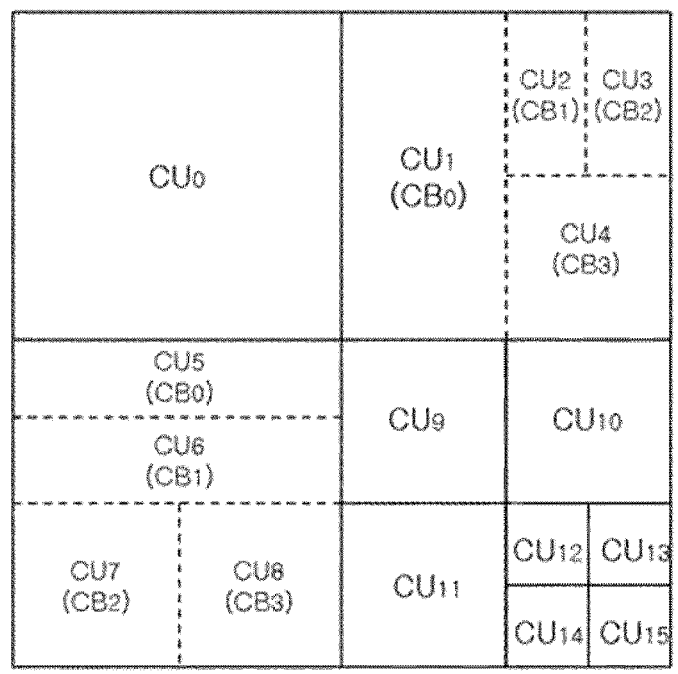
FIG. 9 is a diagram illustrating a second embodiment of a method of partitioning and processing an image into block units.

FIG. 9 is a diagram illustrating a second embodiment of a method of partitioning and processing an image into block units.

Referring to FIG. 9, a coding tree unit (CTU) having a maximum size of 256×256 pixels is partitioned using a quadtree structure into four coding units (CUs) each having a square shape.

At least one of the coding units resulting from the quadtree partitioning may be further partitioned using a binary tree structure into two coding units (CUs) each having a rectangular shape.

Meanwhile, at least one of the coding units resulting from the quadtree partitioning may be further partitioned using a quadtree structure into four coding units (CUs) each having a square shape.

At least one of the coding units resulting from the binary tree partitioning may be further partitioned using a binary tree structure into two coding units (CUs) each having a square or rectangular shape.

Meanwhile, at least one of the coding units resulting from the quadtree partitioning may be further partitioned using a quadtree structure or a binary tree structure into coding units (CUs) each having a square or rectangular shape.

The coding blocks (CBs) resulting from the binary tree partitioning and configured as described above may be used for prediction and transform without being further partitioned. That is, the size of the prediction unit (PU) and transform unit (TU) belonging to the coding block CB as shown in FIG. 9 may be the same as the size of the coding block (CB).

As described above, the coding units resulting from the quadtree partitioning may be partitioned into one or at least two prediction units (PUs) using the method described with reference to FIG. 3 and FIG. 4.

The coding units resulting from the quadtree partitioning as described above may be partitioned into one or at least two transform units (TUs) by using the method described with reference to FIG. 5, and the transform units (TUs) resulting from the partitioning may have a maximum size of 64×64 pixels.

A syntax structure used for partitioning and processing an image on a per-block basis may indicate partition information using a flag. For example, whether or not to partition a coding unit (CU) is indicated by using split_cu_flag, and the depth of a coding unit (CU) partitioned by a binary tree may be indicated by using binary_depth. Whether or not the coding unit (CU) is partitioned using a binary tree structure may be represented by a binary_split_flag.

The methods described above referring to FIGS. 1 to 8 applied to the blocks (for example, coding units (CUs), prediction units (PUs), and transform units (TUs)) resulting from partitioning via the above-mentioned method referring to FIG. 9, so that encoding and decoding of the image may be performed.

Hereinafter, with reference to FIGS. 10 to 15, another embodiment of a method of partitioning a coding unit (CU) into one or at least two transform units (TUs) will be described.

According to an embodiment of the present invention, a coding unit (CU) may be partitioned using a binary tree structure into transform units (TUs), which are the basic units of transform on a residual block.

Figure 10:
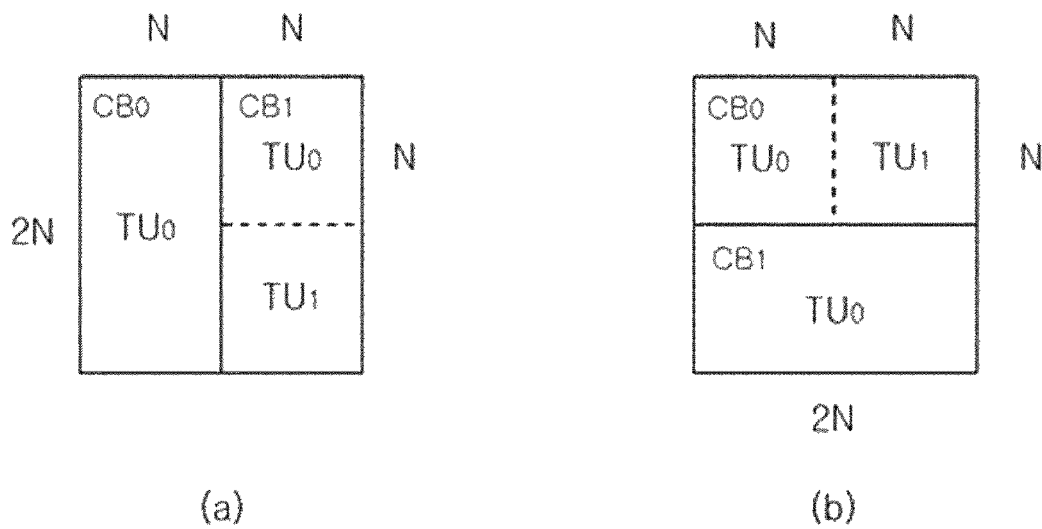
FIG. 10 is a diagram illustrating a third embodiment of a method of partitioning and processing an image into block units.

Referring to FIG. 10, at least one of the rectangular coding blocks CB0 and CB1 resulting from binary tree partitioning and having a size of N×2N or 2N×N is further partitioned using a binary tree structure into square transform units TU0 and TU1 each having a size of N×N.

As described above, the block-based image encoding method may perform prediction, transform, quantization, and entropy encoding steps.

In the prediction step, a prediction signal is generated by referring to a current encoding block and an existing encoded image or a surrounding image, and accordingly a differential signal with respect to the current block may be calculated.

Meanwhile, in the transform step, the transform is performed using various transform functions with the differential signal as an input. The transformed signal is classified into DC coefficient and AC coefficient, thereby obtaining energy compaction and improving the encoding efficiency.

Further, in the quantization step, quantization is performed with transform coefficients as an input, and then entropy encoding is performed on the quantized signal, so that the image may be encoded.

Meanwhile, the image decoding method proceeds in the reverse order of the encoding process as described above, and the quality distortion phenomenon of the image may occur in the quantization step.

In order to reduce the image quality distortion while improving the coding efficiency, the size or shape of the transform unit (TU) and the type of the transform function to be applied may be varied, depending on the distribution of the differential signal input in the transform step and features of the image.

For example, when finding a block similar to a current block through a block-based motion estimation process in a prediction step, a cost measurement method such as a sum of absolute difference (SAD) or a mean square error (MSE) is used, and the distribution of the differential signals may be generated in various forms depending on the characteristics of the image.

Accordingly, effective coding may be performed by selectively determining the size or shape of the transform unit (CU) on the basis of the various distributions of the differential signals.

For example, when a differential signal is generated in a certain coding block CBx, the coding block CBx is partitioned using a binary tree structure into two transform units (TUs). Since the DC value is generally referred to as an average value of the input signals, when the difference signal is received as an input of the transform process, it is possible to efficiently indicate the DC value by partitioning the coding block CBx into two transform units (TUs).

Figure 11:
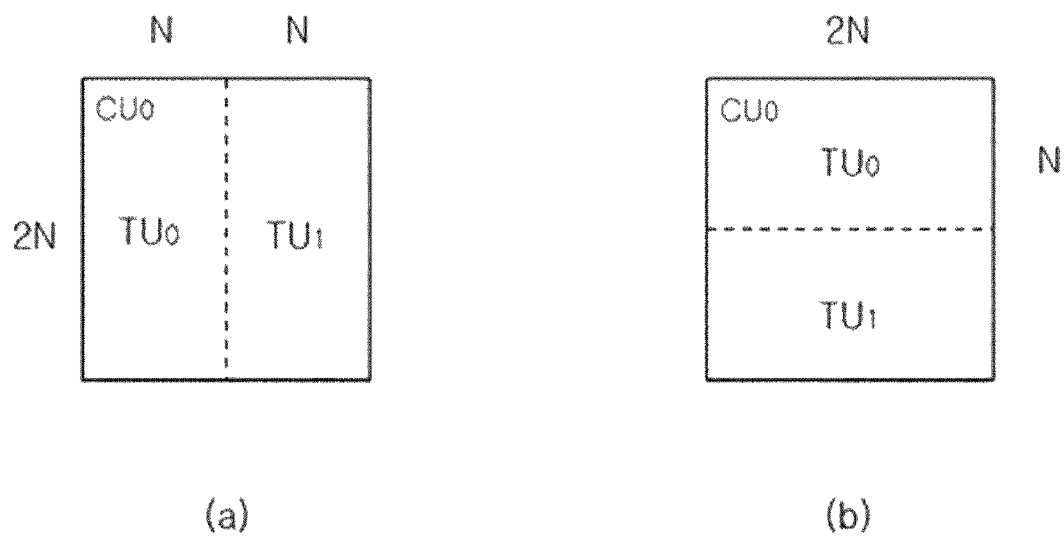
FIG. 11 is a diagram illustrating an embodiment of a method of partitioning a coding unit using a binary tree structure to construct a transform unit.

Referring to FIG. 11, a square coding unit CU0 having a size of 2N×2N is partitioned using a binary tree structure into rectangular transform units TU0 and TU1 having a size of N×2N or 2N×N.

According to another embodiment of the present invention, as described above, the step of partitioning the coding unit (CU) using the binary tree structure is repeated twice or more, thereby obtaining a plurality of transform units (TU).

Figure 12:
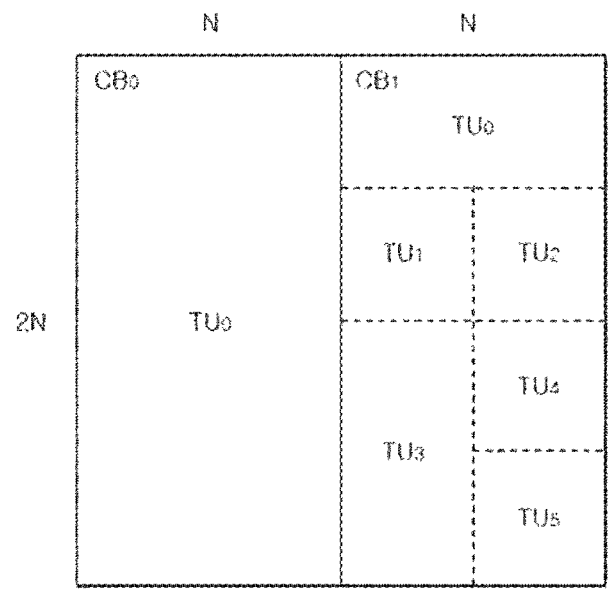
FIG. 12 is a diagram illustrating a fourth embodiment of a method of partitioning and processing an image into block units.

Referring to FIG. 12, a rectangular coding block CB1 having the size of N×2N is partitioned using a binary tree structure, blocks having the size of N×N resulting from the partitioning are further partitioned using a binary tree structure, thereby constructing rectangular blocks each having the size of N/2×N or N×N/2. Then, the blocks each having the size of N/2×N or N×N/2 are further partitioned using a binary tree structure into square transform units TU1, TU2, TU4, and TU5 each having the size of N/2×N/2.

Figure 13:
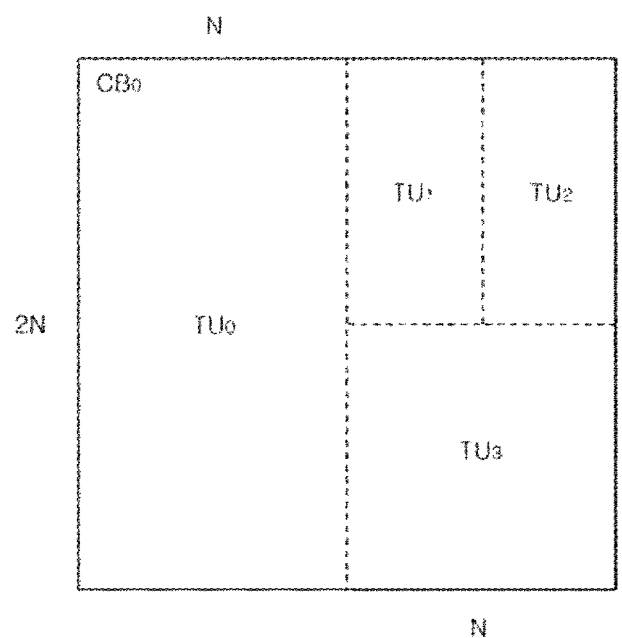
FIGS. 13 to 14 are diagrams illustrating still another embodiment of a method of partitioning and processing an image into block units.

Referring to FIG. 13, a square coding block CB0 having the size of 2N×2N is partitioned using a binary tree structure, and the blocks having the size of the N×2N resulting from the partitioning are further partitioned using a binary tree structure, thereby configuring square blocks having a size of N×N, and then the blocks having the size of N×N may be further partitioned using a binary tree structure into rectangular transform units TU1 and TU2 having the size of N/2×N.

Figure 14:
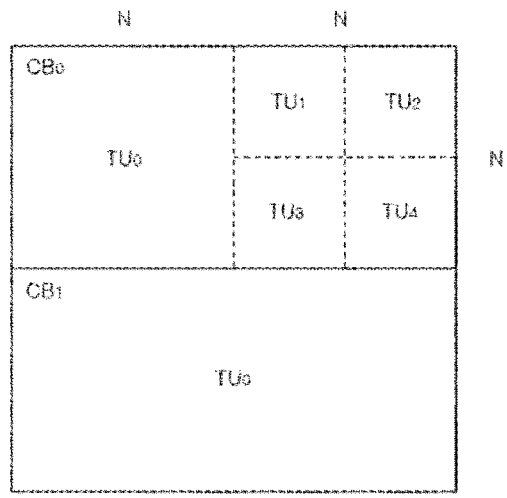

Referring to FIG. 14, a rectangular coding block CB0 having the size of 2N×N is partitioned using a binary tree structure, blocks having the size of N×N resulting from the partitioning are further partitioned using a quadtree structure, thereby obtaining square transform units TU1, TU2, TU3, and TU4 having the size of N/2×N/2.

The methods described with reference to FIGS. 1 to 8 are applied to blocks (for example, coding units (CUs), prediction units (PUs), and transform units (TUs)) resulting from the partitioning via the method described with reference to FIGS. 10 to 14, so that the encoding and decoding may be performed on the image.

Hereinafter, embodiments of a method of determining a block partitioning structure by the encoding apparatus 10 according to the present invention will be described.

The picture partitioning module 110 provided in the image encoding apparatus 10 performs rate distortion optimization (RDO) according to a preset sequence and outputs a prediction unit (PU) and determines partitioning structures of the coding unit (CU), the prediction unit (PU), and the transform unit (TU), which are capable of being partitioned as described above.

For example, in order to determine the block partitioning structure, the picture partitioning module 110 performs rate distortion optimization-quantization (RDO-Q) to determine an optimal block partitioning structure in terms of bitrate and distortion.

Figure 15:
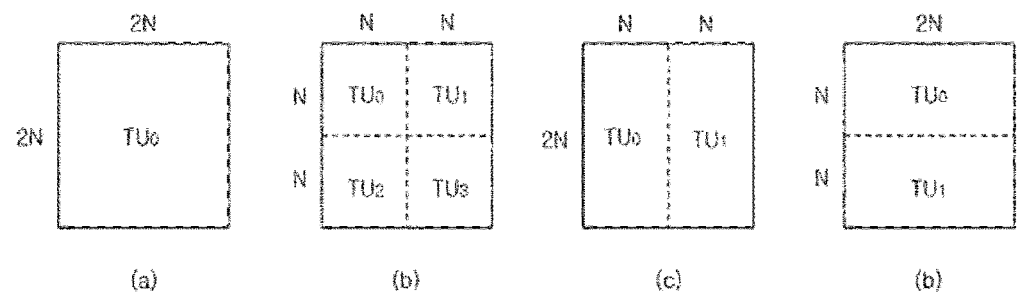
FIGS. 15 and 16 are diagrams illustrating embodiments of a method of determining a partitioning structure of a transform unit by performing rate distortion optimization (RDO).

Referring to FIG. 15, when the coding unit (CU) has a form of 2N×2N pixel size, the RDO is performed in the transform unit (PU) partitioning order of the 2N×2N pixel size shown in (a), the N×N pixel size shown in (b), the N×2N pixel size shown in (c), and the 2N×N pixel size shown in (d), thereby determining the optimum partitioning structure of the transform unit (PU).

Figure 16:
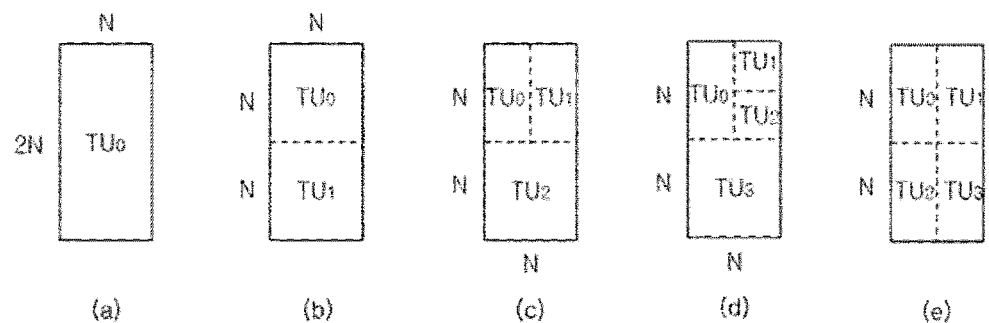

Referring to FIG. 16, when the coding unit (CU) has a form of N×2N or 2N×N pixel size, the RDO is performed in the partitioning structure order for the transform units (PUs) of the pixel size of N×2N (or 2N×N) shown in (a), the pixel size of N×N shown in (b), the pixel sizes of N/2×N (or N×N/2) and N×N shown in (c), the pixel sizes of N/2×N/2, N/2×N, and N×N shown in (d), and the pixel size of N/2×N shown in (e), thereby determining the optimal partitioning structure of the transform unit (PU).

In the above description, the block partitioning method of the present invention has been described as an example in which a block partitioning structure is determined by performing Rate Distortion Optimization (RDO). However, the picture partitioning module 110 may use a sum of absolute difference (SAD) or a mean square error to determine the block partitioning structure, thereby maintaining the efficiency while reducing the complexity.

Hereinafter, an image processing method of providing independence between a coding tree unit and a coding unit size, and encoding and decoding method using the same according to an embodiment of the present invention will be described in more detail.

Figure 17:
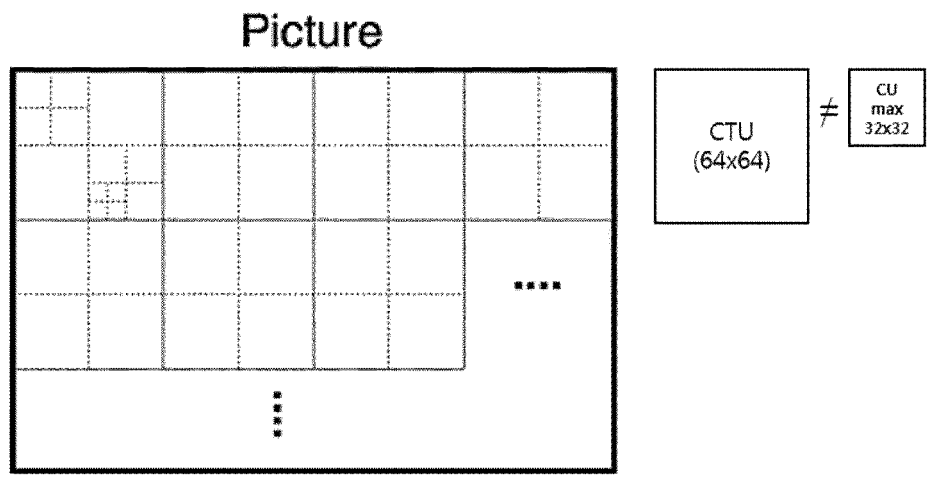
FIG. 17 is a diagram illustrating a relation between a coding tree unit and a coding unit according to an embodiment of the present invention.

FIG. 17 is a diagram illustrating a relation between a coding tree unit and a coding unit according to an embodiment of the present invention.

Referring to FIG. 17, the entire picture may be partitioned into coding tree units (CTUs) as described above, and each CTU may have the same size, for example, a size of 64×64 pixels. Each CTU may be partitioned into coding units (CUs) having various sizes through a quad tree and a binary tree.

In this structure, the encoding apparatus 10 according to an embodiment of the present invention independently determines the size of the CTU and the maximum size of the CU, i.e., determines the size of the CTU and the size of the CU in a non-dependent manner, in consideration of both effects, namely the bandwidth efficiency of the line buffer and the reduction of the implementation cost, whereby it is possible to determine an optimal partition structure that can achieve both effects simultaneously.

To this end, when the picture is partitioned by the picture partitioning module 110, the encoding apparatus 10 may determine the partitioning structure in consideration of the maximum CU size and the CTU size independently within a predetermined arbitrary unit (for example, a sequence level unit). Accordingly, the maximum CU size may be equal to or may not be equal to the CTU size.

Accordingly, when signaling partition information from the picture partitioning module 110 to the decoding apparatus 20, the encoding apparatus 10 may transmit signaling information that the CTU size is different from the maximum CU size corresponding to the CTU size, to the decoding apparatus 20.

Here, the signaling information may be transmitted explicitly or implicitly. In an explicit case, the encoding apparatus 10 may transmit flag information indicating that the CTU size is different from the maximum CU size corresponding to the CTU size together with header information including the flag information therein, or transmit the maximum CU size information together with the header information including the information therein.

In addition, in the implicit case, when the encoding apparatus 10 transmits the partition information (split flag) in the header information, it is possible to skip the partition information for partitioning from the CTU size to the maximum CU size. Accordingly, when the partition information corresponding to the CTU size is skipped stepwise according to the depth, the decoding apparatus 20 identifies the difference between the maximum CU size and the CTU size using the skipped depth information, whereby it is possible to perform partition processing corresponding thereto.

Through such processing, the present invention may independently set the CTU size and the maximum CU size, thereby allowing and signaling the maximum CU size of a smaller size than the CTU while reducing the memory bandwidth according to the processing of the line buffer using the larger-sized CTU than the existing, whereby it is possible to provide encoding and decoding simultaneously considering the implementation cost and compression efficiency.

Thus, the encoding apparatus 10 may determine the optimal maximum coding unit size in consideration of the line buffer bandwidth efficiency corresponding to the coding tree unit size and the implementation cost efficiency corresponding to the maximum coding unit size.

Also, similarly in the structure according to an embodiment of the present invention, which is partitioned through a quadtree and a binary tree, only MinQTSize information, which is the minimum partition size, may be defined according to the current method, and as a result, since the maximum CU size is the CTU size, there is a limit that they cannot be set independently.

Accordingly, assuming that the maximum CU size of the current scheme is 64×64, which is the same as the CTU size, the implementation and processing for 64×64 CU can be excluded by decreasing the maximum CU size in the present invention. Accordingly, the implementation cost and the encoding processing time can be reduced, and with respect to signaling, the split flag from the depth 0 to the maximum coding unit size corresponding to each CTU is not transmitted, thereby improving the compression efficiency.

In addition, assuming that the maximum CU size is 32×32 which is the same as the CTU size in the current method, the maximum CU size is maintained at 32×32 while the CTU size is increased to 64×64 according to the present invention, whereby there is an advantage that it is possible to reduce the memory bandwidth by half by using the line buffer. That is, the memory usage or reference count for the line buffer may be determined according to the CTU size.

Figure 18:
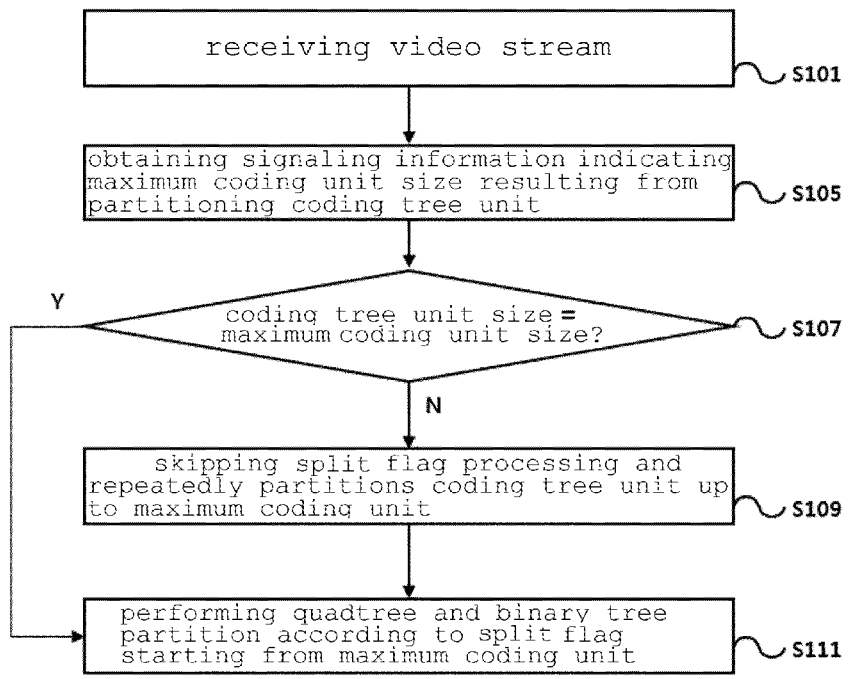
FIG. 18 is a flowchart illustrating an operation of a decoding apparatus for performing the picture partition processing according to an embodiment of the present invention.

FIG. 18 is a flowchart illustrating an operation of a decoding apparatus for performing the picture partition processing according to an embodiment of the present invention.

Referring to FIG. 18, the decoding apparatus 20 receives a video stream (S101), and obtains signaling information indicating the maximum coding unit size resulting from partitioning the coding tree unit from the video stream (S105).

Here, the signaling information may be explicitly obtained from the video stream. Herein, the decoding apparatus 20 may obtain the maximum coding unit size information from the header information of the video stream as the signaling information. Meanwhile, the signaling information may not be transmitted directly but the maximum coding unit size may be implicitly signaled. Herein, the step S105 may be omitted. For example, the decoding apparatus 20 may determine the maximum coding unit size, which may differ from the CTU size, in advance according to the profile, and use the same without any additional signaling information.

Then, the decoding apparatus 20 identifies whether there is a split flag corresponding to the maximum coding tree unit from the header information of the video stream, and performs partition processing to a maximum coding unit size by performing quadtree partitioning up to a depth where partition information is present. This is advantageous in that compression and transmission efficiency can be increased by preventing unnecessary partition information from being received.

Accordingly, when the partition information corresponding to the CTU size is skipped stepwise in accordance with the depth, the decoding apparatus 20 identifies the difference between the maximum CU size and the CTU size using the skipped depth information and performs the partition processing corresponding thereto.

To this end, the decoding apparatus 20 determines whether the coding tree unit size and the maximum coding unit size are the same (S107).

When there is no difference between the coding tree unit size and the maximum coding unit size according to the signaling information, the decoding apparatus 20 sequentially performs the quadtree and binary tree partition according to the split flag starting from the maximum coding unit according to the depth (S111).

Meanwhile, according to the embodiment of the present invention, when the maximum coding unit size is smaller than the coding tree unit, the decoding apparatus 20 skips the split flag processing and repeatedly partitions the coding tree unit up to the maximum coding unit (S109).

In particular, the decoding apparatus 20, in partitioning the coding tree unit up to the maximum coding unit, may process partitioning without any split flag as described above. In addition, in the case where the split flag is skipped, the binary partitioning method other than the quadtree may be excluded.

For example, when partitioning the coding tree unit up to the maximum coding unit, the decoding apparatus 20 may perform only quadtree partitions N times, and then perform quadtree and binary tree partition starting from the maximum coding unit in which the split flag is present.

Figure 19:
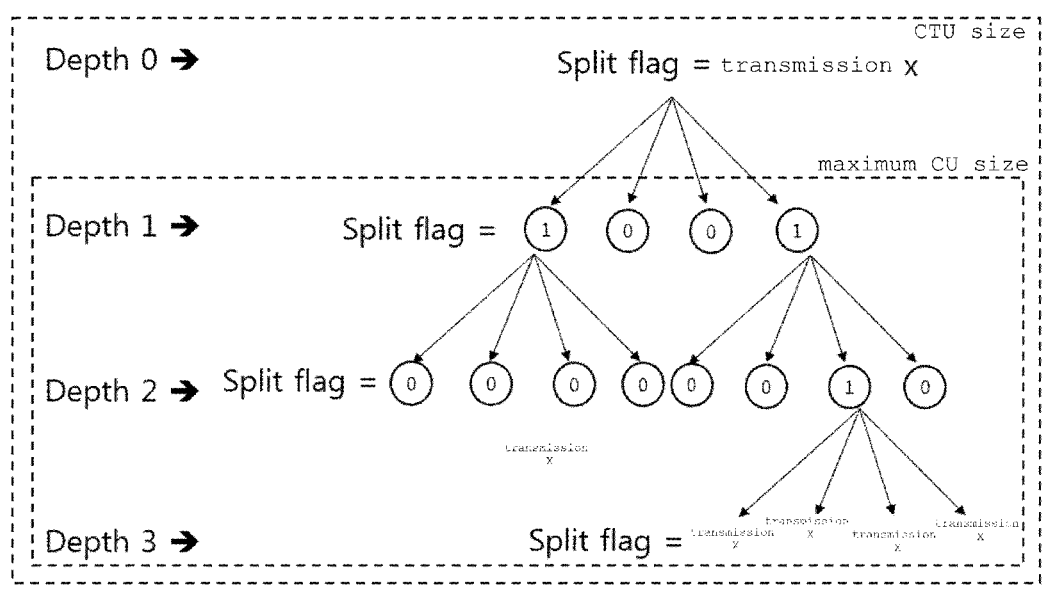
FIG. 19 is a diagram illustrating split flag processing according to an embodiment of the present invention.

FIG. 19 is a diagram illustrating split flag processing according to an embodiment of the present invention.

Referring to FIG. 19, transmission of a split flag of a CTU according to an embodiment of the present invention, determination of the maximum CU size according to the split flag, and partitioning are illustrated.

In FIG. 19, Depth represents depth information increasing by one when performing partition through quadtree on the basis of the CTU size. Particularly, as shown in FIG. 19, since the Depth 0 corresponds to the CTU size, the size of the block is larger than the maximum CU size. In this case, the decoding apparatus 20 may perform quadtree partition without a need to decode the split flag. Therefore, the compression and transmission efficiency can be improved, because the split flag processing is skipped to allow the flag not to be transmitted. Therefore, the decoding apparatus 20 may confirm that the split flag corresponding to the CTU is skipped, and identify the maximum CU size information accordingly.

Meanwhile, the existing split flags may be transmitted up to Depths 1 to 2, and quadtree and binary tree partitions may be performed together. Meanwhile, Depth 3 is a case where the block size is equal to the minimum CU size, and it is obvious that the split flag is not transmitted because partition is no longer performed.

The above-described method according to the present invention may be stored in a computer-readable recording medium. The computer-readable recording medium may be a ROM, a RAM, a CD-ROM, a magnetic tape, a floppy disk, an optical data storage device, and the like, and may also be implemented in the form of a carrier wave (for example, transmission over the Internet).

The computer-readable recording medium may be distributed over a network-connected computer system so that computer-readable code may be stored and executed in a distributed manner. In addition, functional programs, codes and code segments for implementing the above method may be easily inferred by programmers of the technical field to which the present invention belongs.

Although the exemplary embodiments of the present invention have been illustrated and described above, the present invention is not limited to the aforesaid particular embodiments, and can be variously modified by those skilled in the art without departing the gist of the present invention defined in the claims. The modifications should not be understood individually from the technical idea or perspective of the present invention.

The invention claimed is:

1. An image decoding method, comprising:
 obtaining a current coding tree unit (CTU) of a first size configuring a current picture;
 determining whether to implicitly divide the current coding tree unit;
 dividing the current coding tree unit into one or more coding units (CUs) based on the determination;
 obtaining, from a bitstream, division information for a current coding unit among the one or more coding units; and
 dividing and decoding the current coding unit,
 wherein in case the current coding tree unit is determined to be implicitly divided, the dividing the current coding tree unit performs an implicit dividing process without the division information recursively until the current coding tree unit of the first size is divided into a plurality of coding units of a second size, the implicit dividing process without the division information performed by using a quadtree splitting method with skipping decoding of division information, the implicit dividing process without the division information is performed without considering the division information,
 wherein the dividing and decoding the current coding unit divides the current coding unit by using a dividing process with the division information,
 wherein any splitting method other than the quadtree splitting method is excluded for the implicit dividing process without the division information,
 wherein the dividing process with the division information uses a selected splitting method among a multiple splitting methods including the quadtree splitting method and a binary tree splitting method,
 wherein the dividing and decoding the current coding unit is performed by using dequantization corresponding to at least one quantization parameter, the at least one quantization parameter decided by using a quantization parameter predictor,
 wherein the quantization parameter predictor is decided by considering a coding unit order which is decided by decoding or encoding the image, and
 wherein the quantization parameter predictor of the current coding unit is generated by searching a left coding unit and a top coding unit of the current coding unit, for one or two valid quantization parameters,
 wherein the coding unit is decoded by:
 determining a transform matrix, and
 performing inverse-transforming using the determined transform matrix,
 wherein, in case the coding unit is intra predicted, the transform matrix is determined based on directionality of an intra prediction mode.

2. The method of claim 1, wherein the determining whether to implicitly divide the current coding tree unit is performed based on information signaled at a sequence level.

3. The method of claim 1, wherein in case the current coding tree unit is determined not to be implicitly divided, the dividing the current coding tree unit into one or more coding units (CUs) comprises:
 obtaining, from the bitstream, division information for the current coding tree unit; and
 dividing, based on the division information, the coding tree unit into one or more coding units.

4. The method of claim 3, wherein the division information for the current coding tree unit comprises information indicating one among the plurality of splitting methods, wherein the plurality of splitting methods comprises the quadtree splitting method and the binary tree splitting method.

5. The method of claim 1, wherein the division information for the current coding unit comprises information indicating one among the plurality of splitting methods, wherein the plurality of splitting methods comprises the quadtree splitting method and the binary tree splitting method.

6. An image encoding method, comprising:
dividing an input image into a plurality of coding tree units (CTUs) of a first size;
dividing a current coding tree unit among the plurality of coding tree units into one or more coding units (CUs);
encoding division information for division of a current coding unit among the one or more coding units into a bitstream; and
encoding the coding units,
wherein the bitstream includes information which is used for determining whether to implicitly divide the current coding tree unit, wherein in case the current coding tree unit is determined to be implicitly divided, encoding of division information is skipped and the division from the current coding tree unit of the first size to a plurality of coding units of a second size is performed by using a quadtree splitting method until the current coding tree unit of the first size is divided into the plurality of coding units of the second size,
wherein the current coding unit is divided by using at least one among a plurality of splitting methods including a quadtree splitting method and a binary tree splitting method,
wherein in case the current coding tree unit is determined to be implicitly divided, the current coding tree unit corresponds to an implicit dividing process without the division information, and
the current coding unit corresponds to a dividing process with the division information,
wherein any splitting method other than the quadtree splitting method is excluded for the implicit dividing process without the division information,
wherein the dividing process with the division information uses a selected splitting method among a multiple splitting methods including the quadtree splitting method and a binary tree splitting method,
wherein the encoding the coding units is performed by using quantization corresponding to at least one quantization parameter,
wherein the bitstream includes information for deciding a quantization parameter predictor corresponding to the at least one quantization parameter,
wherein the quantization parameter predictor is decided by considering a coding unit order which is decided by decoding or encoding the image, and
wherein the quantization parameter predictor of the current coding unit is generated by searching a left coding unit and a top coding unit of the current coding unit, for one or two valid quantization parameters,
wherein the coding unit is encoded by:
determining a transform matrix; and
performing transforming using the determined transform matrix,
wherein, in case the coding unit is intra predicted, the transform matrix is determined based on directionality of an intra prediction mode.

7. The method of claim 6, wherein the information which is used for determining whether to implicitly divide the current coding tree unit is signaled at a sequence level.

8. The method of claim 6, wherein the division information for the current coding unit comprises information indicating one among the plurality of splitting methods, and
wherein the plurality of splitting methods comprises the quadtree splitting method and the binary tree splitting method.

9. A method of transmitting a bitstream, the method comprising:
dividing an input image into a plurality of coding tree units (CTUs) of a first size;
dividing a current coding tree unit among the plurality of coding tree units into one or more coding units (CUs);
encoding division information for division of a current coding unit among the one or more coding units into a bitstream;
encoding the coding units, and
transmitting the bitstream,
wherein the bitstream includes information which is used for determining whether to implicitly divide the current coding tree unit,
wherein in case the current coding tree unit is determined to be implicitly divided, encoding of division information is skipped and the division from the current coding tree unit of the first size to a plurality of coding units of a second size is performed by using a quadtree splitting method until the current coding tree unit of the first size is divided into the plurality of coding units of the second size, and
wherein the current coding unit is divided by using at least one among a plurality of splitting methods including a quadtree splitting method and a binary tree splitting method,
wherein in case the current coding tree unit is determined to be implicitly divided, the current coding tree unit corresponds to an implicit dividing process without the division information, and
the current coding unit corresponds to a dividing process with the division information,
wherein any splitting method other than the quadtree splitting method is excluded for the implicit dividing process without the division information,
wherein the dividing process with the division information uses a selected splitting method among a multiple splitting methods including the quadtree splitting method and a binary tree splitting method,
wherein the encoding the coding units is performed by using quantization corresponding to at least one quantization parameter,
wherein the bitstream includes information for deciding a quantization parameter predictor corresponding to the at least one quantization parameter,
wherein the quantization parameter predictor is decided by considering a coding unit order which is decided by decoding or encoding the image, and
wherein the quantization parameter predictor of the current coding unit is generated by searching a left coding unit and a top coding unit of the current coding unit, for one or two valid quantization parameters,
wherein the coding unit is encoded by:
determining a transform matrix; and
performing transforming using the determined transform matrix,
wherein, in case the coding unit is intra predicted, the transform matrix is determined based on directionality of an intra prediction mode.

* * * * *